United States Patent [19]

Chirico

[11] 4,190,210

[45] Feb. 26, 1980

[54] METHOD AND ARRANGEMENT FOR WINDING CAPACITORS

[76] Inventor: Cataldo C. Chirico, 107 Passage Emile Boutrais, 94120 Fontenay-sous-Bois, France

[21] Appl. No.: 852,038

[22] Filed: Nov. 16, 1977

[30] Foreign Application Priority Data

Dec. 3, 1976 [FR] France ................................ 76 36456

[51] Int. Cl.² .................... H01G 13/02; H01G 7/00
[52] U.S. Cl. ................................ 242/56.1; 242/68.4; 242/74; 242/81
[58] Field of Search .................... 242/56.1, 78.3, 74.1, 242/81, 68, 74, 56 A, 56 R, 68.4, 74.2, 79, 80, 78.1, 68.1, 55

[56] References Cited

U.S. PATENT DOCUMENTS

| 1,841,628 | 1/1932 | Pickard | 242/56.1 |
| 3,401,900 | 9/1968 | Lutz | 242/74 X |

*Primary Examiner*—George F. Mautz
*Attorney, Agent, or Firm*—Michael J. Striker

[57] ABSTRACT

A method of winding a film onto a mandrel for forming a capacitor in which the mandrel remains inside of the latter comprising the steps of placing a free end portion of a film onto the mandrel but without securing it to the same, and winding this free end portion onto the mandrel, superposing a displaceable element over the wound portion of the film so as to retain the latter on the mandrel, rotating the mandrel while the displaceable element retains the wound portion on the film so as to wind a remainder portion of the film onto the mandrel, and withdrawing the displaceable element from the film wound on the mandrel. An arrangement for winding a film onto a mandrel so as to form a capacitor comprises elements for rotatably supporting a mandrel onto which a film is to be wound, element for rotating the mandrel so as to wind the film onto the latter, and a retaining element displaceable between a first position in which it is superposed over an initial portion of the film wound onto the mandrel during subsequent winding of the additional portions of the film onto the latter, and a second position in which the retaining element is withdrawn from the film wound on the mandrel.

12 Claims, 4 Drawing Figures

METHOD AND ARRANGEMENT FOR WINDING CAPACITORS

BACKGROUND OF THE INVENTION

The present invention relates to a method of and arrangement for winding capacitors.

It has been proposed in the art to wind a capacitor by means of a spindle forming an integral part of the machine and to thereafter remove the obtained article from the spindle which article includes a central throughgoing channel with open axial ends.

It is therefore necessary to obturate the open ends of the channel before subsequent metallization of the article. This operation is delicate and frequently even imperfect, because the particles of the metal can penetrate into the capacitor and short-circuit the same.

Furthermore, the central turns of the winding, that is the turns first wound are not supported and the temperature variations may cause changes of their positions and thereby may also cause changes of the capacitance of the capacitor.

It also is appropriate to mention that sliding of the article relative to the spindle can damage the initial turns of the metallized films.

In order to overcome these disadvantages, another method has been proposed including winding of the capacitor onto a mandrel made of an insulating material, which mandrel remains inside of the winding.

This method requires fixation of the films on the mandrel which is to be rotated. This fixation is performed by glueing of an initial portion of the film to the mandrel.

Such an operation is delicate and therefore slow.

In addition thereto, this operation is connected with application of sometimes instable material which could be harmful for the capacitor.

SUMMARY OF THE INVENTION

Accordingly, it is an object of the present invention to provide a method of and an arrangement for winding a film onto a mandrel for forming a capacitor, which avoid the disadvantages of the prior art.

More particularly, it is an object of the present invention to provide a method of and an arrangement for winding a film onto a mandrel for forming a capacitor, which are simple and reliable, and do not require utilization of an additional material for securing the film to the mandrel.

In keeping with these objects, and with others which will become apparent hereinafter, one feature of the present invention resides, briefly stated, in a method of winding a film onto a mandrel for forming a capacitor, which comprises the steps of placing a free end portion of a film onto the mandrel but without securing it to the same, and winding this free end portion onto a mandrel, superposing a displaceable element over the wound portion of the film so as to retain the latter on the mandrel, rotating the mandrel while the displaceable element retains the wound portion of the film so as wind a remainder portion of the film onto the mandrel, and withdrawing the displaceable element from the film wound on the mandrel. An arrangement for performing the above method includes elements for rotatably supporting the mandrel onto which a film is to be wound, elements for rotating the mandrel so as to wind the film onto the latter, and retaining element displaceable between a first position in which it is superposed over an initial portion of the film wound onto the mandrel so as to retain the latter during subsequent winding of additional portions of the film, and a second position in which the retaining elements are withdrawn from the film wound on the mandrel.

When a capacitor is produced in accordance with the above-proposed method and by means of the above-proposed arrangement, it is not necessary to obturate the capacitor inasmuch as the film is already wound on the mandrel. It is not needed to use glue for securing the initial portion of the film to the mandrel since the initial portion of the film is retained on the mandrel by means of the displaceable elements. Therefore, the delicate and slow operation of glueing is excluded. At the same time the utilization of an instable glueing material is also excluded.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

DESCRIPTION OF A PREFERRED EMBODIMENT

Figure 1:
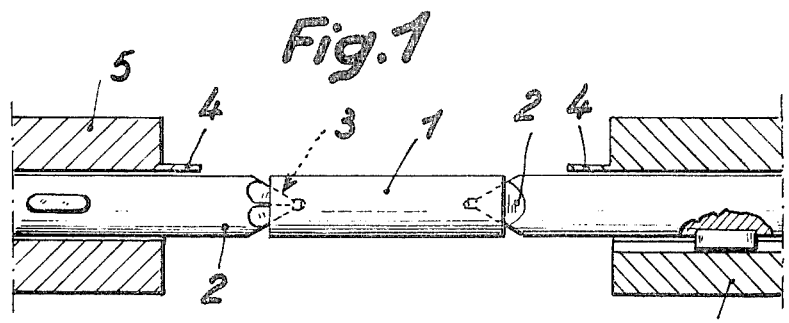
FIG. 1 is a diagrammatic sectional view showing the arrangement of this invention.

Films A are to be wound onto the mandrel 1 which is cylindrical and constituted of a plastic material of insulating quality and which remains inside of the winding. The mandrel is rotated by a pair of centers 2 which are respectively movable in axial directions and are driven, or at least one of which is axially movable and driven. The centers 2 are axially biased toward the mandrel and somewhat penetrate into front cavities 3 provided in the ends of the mandrel 1.

According to the invention, two fingers 4 are axially movable and may extend over the mandrel 1. These fingers are carried, for instance, by two sockets 5, mounted on the centers 2 and are rotated by the same, this drive may also be arranged inversely.

For the purpose of winding a capacitor, the mandrel 1 is placed between the centers 2 and then an initial portion A' of the films is wound onto the mandrel 1.

Figure 2:
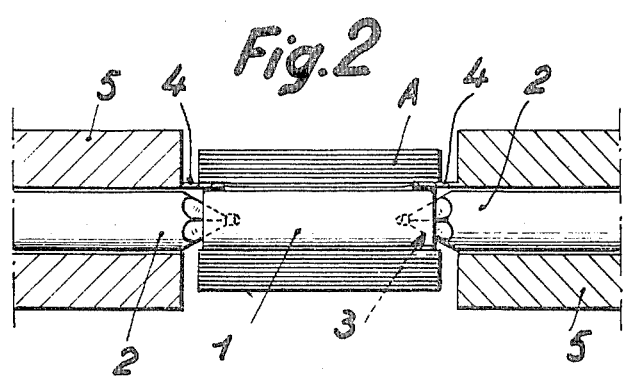
FIG. 2 is a view showing the arrangement, and a capacitor in an intermediate stage of the winding.
Figure 3:
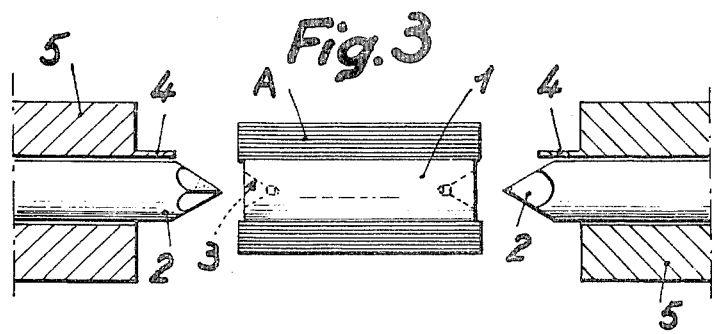
FIG. 3 is a view corresponding to that shown in FIG. 2, but showing the capacitor in a final stage of winding.
Figure 4:
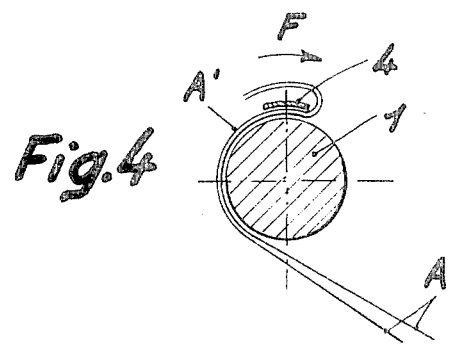
FIG. 4 is a transverse sectional view at an enlarged scale depicting retaining of the films.

The sockets 5 are axially displaced so that the fingers 4 extend over the films, then the winding in the direction of arrow F is started (FIG. 2). The fingers revolve in synchronism with the mandrel and entrain the films (FIG. 4).

As soon as the winding is terminated, the sockets 5 are displaced in the reversed direction for disengaging the fingers 4. Then the centers 2 are shifted away (practically, it suffices if one only center is movable in axial direction).

The method and the arrangement may be made entirely automatic, and a capacitor manufactured thereby is free of any alien body.

Quite naturally, the fingers 4 form in the initial turns of the capacitor small gaps, which, however do not represent any inconvenience and disappear during the thermal treatments.

As can be seen from FIG. 4, the finger 4 is configured in its cross-section as a curvilinear lamella whose thickness may be of several tenths of millimeter.

It seems to be preferable to have the fingers short 4, as the drawing shows. It is also possible to provide one sole finger which would not extend along the entire length of the mandrel.

It is well understandable that the present invention enables a lot of possible variations that, despite their using structurally different means, would fulfil the same functions in regard to the same result.

This invention also relates to the product obtained in practice of the process described herein above, i.e. a capacitor wound on a mandrel and devoid of any alien bodies.

I claim:

1. An arrangement for winding a film onto a mandrel so as to form a capacitor thereon, comprising means for rotatably supporting a mandrel onto which a film is to be wound; means for rotating the mandrel so as to wind the film onto the latter including two centers at least one of which is rotatable, said centers being movable between an operative position in which they engage the mandrel so as to rotate the latter, and an inoperative position in which they are withdrawn from the mandrel; and retaining means displaceable between a first position in which it is superposed over an initial portion of the film wound onto the mandrel so as to retain the initial portion of the film on the mandrel, during subsequent winding of additional portions of the film onto the latter, and a second position in which said retaining means is withdrawn from the film wound on the mandrel.

2. The arrangement as defined in claim 1, wherein said retaining means is rotatable, said rotating means being operative for rotating said retaining means simultaneously with the rotation of the mandrel.

3. The arrangement as defined in claim 1, wherein said retaining means includes at least one finger displaceable toward the mandrel so as to assume said first position in which said finger is superposed over the initial portion of the film, and away from the mandrel so as to assume said second position in which said finger is withdrawn from the film wound on the mandrel.

4. The arrangement as defined in claim 3, wherein the mandrel has an axis and is elongated in an axial direction, said finger being movable toward and away from the mandrel in the direction of elongation of the latter.

5. The arrangement as defined in claim 4, wherein the mandrel has an outer surface, said finger having at least a portion located above at least an axial section of the mandrel in said first position.

6. The arrangement as defined in claim 5, wherein said finger is formed by a relatively thin curvilinear plate.

7. The arrangement as defined in claim 5, wherein said plate is concentric with the mandrel.

8. An arrangement for winding a film onto a mandrel having an axis and two axially spaced ends, so as to form a capacitor thereon, comprising means for rotatably supporting a mandrel onto which a film is to be wound; means for rotating the mandrel so as to wind the film onto the latter; and retaining means displaceable between a first position in which it is superposed over an initial portion of the film wound onto the mandrel so as to retain the initial portion of the film on the mandrel, during subsequent winding of additional portions of the film onto the latter, and a second position in which said retaining means is withdrawn from the film wound on the mandrel, said retaining means including two fingers each located at respective one of said ends of the mandrel and displaceable toward the mandrel so as to assume said first position in which said fingers are superposed over the initial portion of the film, and away from the mandrel so as to assume said second position in which said fingers are withdrawn from the film wound on the mandrel.

9. An arrangement for winding a film onto a mandrel having an axis and elongated in an axial direction, so as to form a capacitor thereon, comprising means for rotatably supporting a mandrel onto which a film is to be wound; means for rotating the mandrel so as to wind the film onto the latter; and retaining means displaceable between a first position in which it is superposed over an initial portion of the film wound onto the mandrel so as to retain the initial portion of the film on the mandrel, during subsequent winding of additional portions of the film onto the latter, and a second position in which said retaining means is withdrawn from the film wound on the mandrel, said retaining means including at least one finger displaceable in the direction of elongation of the mandrel toward the mandrel so as to assume said first position in which said finger is superposed over the initial portion of the film, and away from the mandrel so as to assume said second position in which said finger is withdrawn from the film wound on the mandrel, said finger having at least a portion which is located above at least an axial section of the mandrel in said first position and being radially spaced from an outer surface of the mandrel in said first position so as to form a gap between the outer surface of the mandrel and said finger, said gap being sufficient for passage of the film therethrough.

10. The arrangement as defined in claim 9, wherein the film to be wound has a predetermined thickness, said gap having a dimension exceeding the thickness of the film.

11. A method of winding a film onto a mandrel having an axis for forming a capacitor which mandrel remains inside the latter, comprising the steps of placing a free end portion of a film onto the mandrel but without securing it to the same, and winding this free end portion onto the mandrel; providing axially displaceable means for retaining the wound portion of the film on the mandrel; displacing said retaining means in an axial direction so as to superpose the same over the wound portion of the film to thereby retain the latter on the mandrel; rotating the mandrel while the displaceable means retains the wound portion of the film so as to wind a remainder portion of the film onto the mandrel; and withdrawing the displaceable means from the film wound on the mandrel.

12. The method as defined in claim 11, and further comprising the step of rotating the displaceable means simultaneously with the rotation of the mandrel.

* * * * *